United States Patent
Yokoyama et al.

(10) Patent No.: US 8,068,249 B2
(45) Date of Patent: Nov. 29, 2011

(54) IMAGE FORMING APPARATUS AND CONTROL METHOD THEREOF

(75) Inventors: Hidehiko Yokoyama, Machida (JP); So Yokomizo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 835 days.

(21) Appl. No.: 12/139,890

(22) Filed: Jun. 16, 2008

(65) Prior Publication Data

US 2008/0316522 A1  Dec. 25, 2008

(30) Foreign Application Priority Data

Jun. 20, 2007  (JP) ................................. 2007-163017

(51) Int. Cl.
G06F 3/12 (2006.01)
G06F 12/00 (2006.01)

(52) U.S. Cl. ...................... 358/1.15; 358/1.13; 358/1.14; 358/1.16; 713/1; 713/100; 713/161; 711/163; 710/240; 718/100

(58) Field of Classification Search .................. 358/1.15, 358/1.14, 1.16, 1.13, 437; 713/1, 2, 100, 713/182, 176, 161, 173, 180; 719/321, 217, 719/223, 229, 225, 219, 227; 700/1, 20; 710/240; 711/162, 163; 718/100
See application file for complete search history.

(56) References Cited

U.S. PATENT DOCUMENTS

| | | | | |
|---|---|---|---|---|
| 5,144,692 A * | 9/1992 | Baker et al. | ................... | 710/240 |
| 5,754,821 A * | 5/1998 | Cripe et al. | ................... | 711/164 |
| 6,052,781 A * | 4/2000 | Weber | .............................. | 726/22 |
| 6,178,503 B1 * | 1/2001 | Madden et al. | ................... | 713/2 |
| 6,578,140 B1 * | 6/2003 | Policard | ............................ | 713/1 |
| 6,839,836 B2 * | 1/2005 | Cole et al. | ......................... | 713/2 |
| 7,210,043 B2 * | 4/2007 | Miyazaki et al. | ............. | 713/193 |
| 7,424,601 B2 * | 9/2008 | Xu | .................................... | 713/1 |
| 7,607,140 B2 * | 10/2009 | Kato et al. | .................... | 719/321 |
| 7,873,961 B2 * | 1/2011 | Miller et al. | .................. | 718/100 |
| 2002/0099837 A1 * | 7/2002 | Oe et al. | ........................ | 709/229 |
| 2006/0010314 A1 * | 1/2006 | Xu | ................................... | 713/2 |
| 2009/0249435 A1 * | 10/2009 | Madathilparambil et al. | .... | 726/1 |

FOREIGN PATENT DOCUMENTS

| | | |
|---|---|---|
| JP | 2004-303216 | 10/2004 |
| JP | 2006-031575 | 2/2006 |

* cited by examiner

*Primary Examiner* — Twyler Haskins
*Assistant Examiner* — Dennis Dicker
(74) *Attorney, Agent, or Firm* — Cowan, Liebowitz & Latman, P.C.

(57) ABSTRACT

The present invention provides an image forming apparatus that includes a first system and a second system, wherein the permission/prohibition of access to a storage unit provided in the first system is controlled appropriately based on a signal transmitted from the second system, and a control method thereof. To accomplish this, the image forming apparatus of the present invention includes the first system and the second system, and permits access to the storage unit only when executing a program that includes a predetermined process to activate the apparatus using an external storage apparatus.

14 Claims, 10 Drawing Sheets

IMAGE FORMING APPARATUS AND CONTROL METHOD THEREOF

BACKGROUND OF THE INVENTION

1. Field of the Invention

The present invention relates to an image forming apparatus and a control method thereof.

2. Description of the Related Art

In recent years, demand for image forming apparatuses is shifting from printing apparatuses intended only for printing to multi-function peripherals that implement multiple functions such as scanning and faxing. Operating systems are widely used in order for such image forming apparatuses to execute application programs to implement multiple functions. As image forming apparatuses become more advanced, systems that allow maintenance workers to activate the image forming apparatuses using storage apparatuses (e.g., removable media) for maintenance purposes are beginning to be incorporated into image forming apparatuses. It is very advantageous, in terms of maintenance of the image forming apparatuses, to activate an image forming apparatus into an operational state by loading an operating system from a storage apparatus. However, if an inappropriate operating system is stored in the storage apparatus, it can cause problems such as system crashes, data leakage, and so on. Further, a situation may also occur in which the inappropriate application program stored in the storage apparatus is transferred into another storage apparatus (e.g., hard disk) provided in the image forming apparatus. In this case, problems such as system crashes, data leakage, and so on can occur as a result of executing the inappropriate application program.

Japanese Patent Laid-Open No. 2004-303216 discloses a method for suppressing activation from a removable medium other than those whose serial numbers are registered in advance. Specifically, according to the method disclosed in Japanese Patent Laid-Open No. 2004-303216, the serial number of a removable medium is registered in an apparatus that activates a program from the removable medium. The apparatus performs the activation process only when the removable medium having the registered serial number is used, thereby suppressing inappropriate access to the apparatus.

The method of the related art, however, has the following problems. For example, in the case of the method disclosed in Japanese Patent Laid-Open No. 2004-303216, it is necessary to associate the image forming apparatus with a specified removable medium. Accordingly, when conducting maintenance on a plurality of image forming apparatuses using removable media, it is necessary to register the serial numbers of all removable media that may be used in each image forming apparatus. Therefore, the method according to the related art is problematic in that as the number of image forming apparatuses that need maintenance increases, the amount of work that has to be done by the administrator increases.

Further, the method of the related art does not prevent the inappropriate application program from being stored into another storage apparatus (e.g., hard disk) that is provided in the image forming apparatus.

SUMMARY OF THE INVENTION

The present invention enables realization of an image forming apparatus that includes a first system and a second system, wherein the permission/prohibition of access to a storage unit provided in the first system is controlled appropriately based on a signal transmitted from the second system, and a control method of the image forming apparatus.

One aspect of the present invention provides an image forming apparatus including a first system and a second system, the first system comprising: a first control unit adapted to control the first system; a connection unit adapted to connect to an external storage unit adapted to store a first OS program for operating the first system and a second OS program for operating the second system; an application program storage unit adapted to store an application program that is executable by the first OS program; an access control unit adapted to control access to the external storage unit and the application program storage unit; and a provision unit adapted to acquire the second OS program from the external storage unit and provide the acquired second OS program to the second system, and the second system comprising: a second control unit adapted to control the second system, the second control unit operating the second system based on the second OS program provided by the provision unit; and a transmission unit adapted to transmit, to the access control unit, a permit signal for permitting the first control unit to access the application program storage unit, in response to the second system being in an operational state, wherein the access control unit prohibits the first control unit from accessing the application program storage unit until the access control unit receives the permit signal, and permits the first control unit to access the application program storage unit upon receiving the permit signal.

Another aspect of the present invention provides a method for controlling an image forming apparatus including a first system that is controlled by a first control unit, a second system that is controlled by a second control unit, a connection unit adapted to connect to an external storage unit adapted to store a first OS program for operating the first system and a second OS program for operating the second system, and an application program storage unit adapted to store an application program that is executable by the first OS program, the method comprising the steps of: controlling access to the external storage unit and the application program storage unit; providing the second OS program to the second system after acquiring the second OS program from the external storage unit; operating the second system based on the second OS program provided in the providing step; and transmitting, from the second system to the first system, a permit signal for permitting the first control unit to access the application program storage unit, in response to the second system being in an operational state, wherein the access control step prohibits the first control unit from accessing the application program storage unit until the first system receives the permit signal, and permits the first control unit to access the application program storage unit, in response to the first system receiving the permit signal.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment 1

Figure 1:
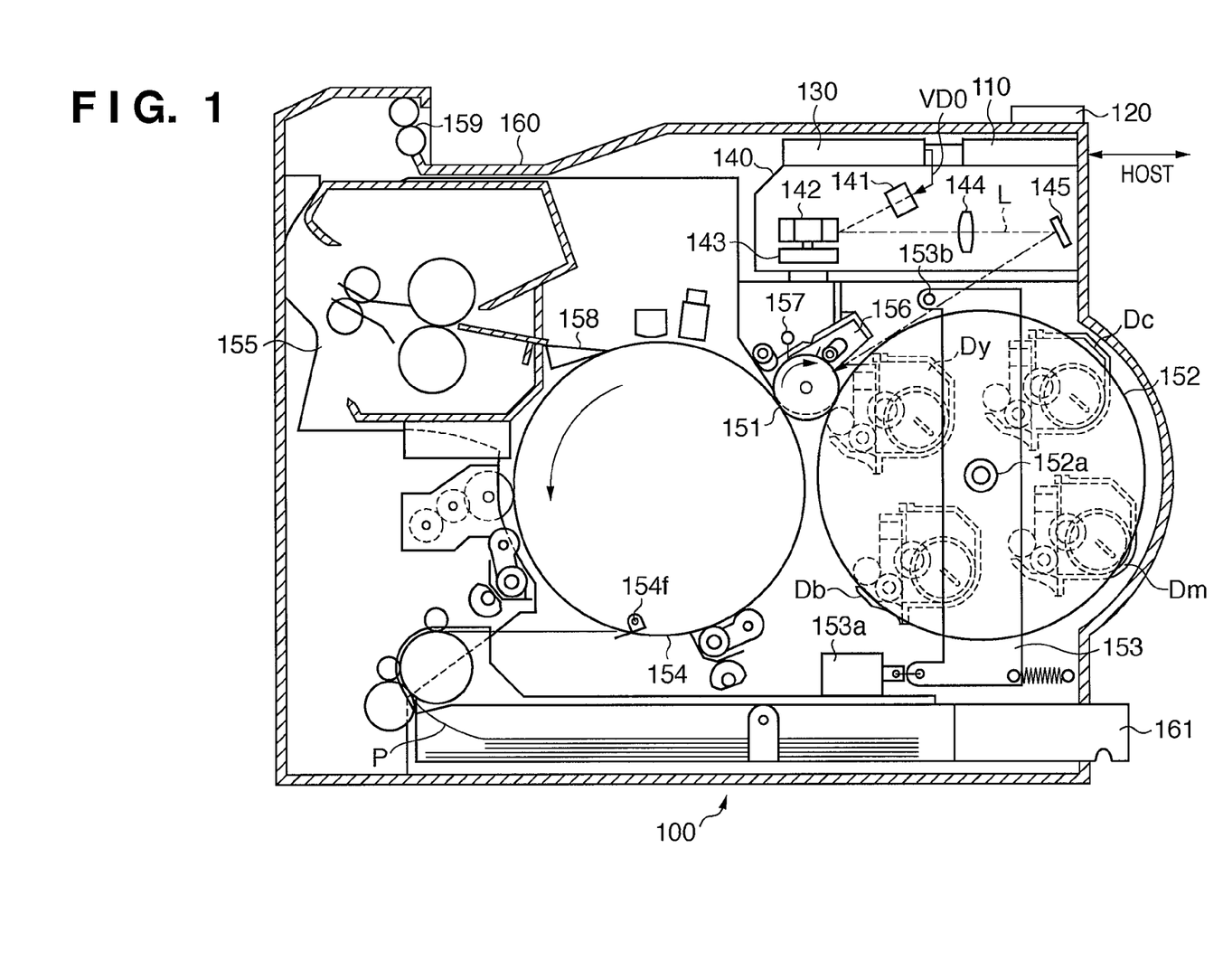
FIG. 1 is a cross-sectional view illustrating an exemplary configuration of a color laser beam printer according to Embodiment 1.

Hereinafter, Embodiment 1 shall be described with reference to FIGS. 1 to 6 and FIG. 9. FIG. 1 is a cross-sectional view illustrating an exemplary configuration of a color laser beam printer (hereinafter referred to as "printer") according to Embodiment 1.

Reference numeral 100 in FIG. 1 denotes the printer. The printer 100 receives print instructions that include print data (character code, image data, etc.) and control code from an externally connected host computer, and stores the instructions. Then, the printer 100 generates corresponding character patterns, images, and the like in accordance with the print instructions, and forms visible images on a recording material.

The printer 100 includes a system control unit 110, an operation panel 120, an output control unit 130, an optical unit 140, and a photosensitive drum 151. The printer 100 further includes a selection mechanism unit 152, a holding frame 153, a transfer drum 154, a fixing unit 155, a charger 156, a cleaning unit 157, a separating claw 158, a paper discharge unit 159, a discharge tray 160, and a recording material cassette 161.

The system control unit 110 analyzes print instructions supplied from the host computer to generate print images, and also controls the printer 100. The system control unit 110 is connected to the operation panel 120 for receiving operation instructions from the user and providing status notifications to the user. The operation panel 120 includes switches, an LED display, and the like, and is installed integrated with the casing of the printer 100. A print image generated in the system control unit 110 is transmitted to the output control unit 130 in the form of a video signal. The output control unit 130 outputs a control signal to the optical unit 140 and various driving mechanism units to control the print process.

In the printer 100, a recording material P conveyed from the recording material cassette 161 is wound around the transfer drum 154 with the leading edge of the recording medium held by a gripper 154f. An electrostatic latent image of an original document that is separated into four colors is formed on the photosensitive drum 151 by the optical unit 140.

Specifically, the photosensitive drum 151 is first charged uniformly to a predetermined negative polarity by the charger 156. Here, a print instruction developed as a device-dependent bitmap is converted into a video signal of the corresponding pattern by the system control unit 110, and the resultant is output to the optical unit 140. The optical unit 140 includes, for forming electrostatic latent images, a semiconductor laser 141, a polygon mirror 142, a scanner motor 143, a polygon lens 144, and a reflecting mirror 145. Laser light that is emitted from the semiconductor laser 141 is controlled to be turned on or off by an input of the video signal. The laser light is reflected off of the polygon mirror 142 that is rotated at a high speed by the scanner motor 143, and is scanned/exposed on the photosensitive drum 151 through the polygon lens 144 and the reflecting mirror 145. Through this, an electrostatic latent image corresponding to the video signal is formed on the photosensitive drum 151.

The formed electrostatic latent image is developed sequentially by color developing units Dy, Dm, Dc and Db. The developing units Dy, Dm, Dc and Db have yellow (Y), magenta (M), cyan (C), and black (B) toners, respectively. Then, the developed toner images of respective colors are superimposed and transferred onto the recording material P on the transfer drum, and thus a multicolor image is formed on the recording material P.

Specifically, a magenta (M) electrostatic latent image is developed by the magenta (M) developing unit Dm to form a first toner image in magenta (M) on the photosensitive drum 151. Meanwhile, the recording material P is conveyed at a predetermined timing, and a transfer bias voltage having a polarity opposite to that of the toner (e.g., a positive polarity) is applied to the transfer drum 154. Thereby, the first toner image on the photosensitive drum 151 is transferred onto the recording material P, and at the same time, the recording material P electrostatically adheres to the surface of the transfer drum 154.

After that, the magenta (M) toner remaining on the photosensitive drum 151 is removed by the cleaning unit 157, and the printer 100 moves to the process of forming and developing a latent image for the next color. The toner images of cyan (C), yellow (Y), and black (Bk) are transferred, in that order, in the same manner as described above, except that a bias voltage higher than that for the previous color is applied to the transfer drum 154 during the transfer process of respective colors.

The operation of the selection mechanism unit 152 shall be described now. The selection mechanism unit 152 has a rotation axis 152a that is connected to the holding frame 153. The holding frame 153 has a solenoid 153a and a pivot 153b. Each of the color developing units Dy, Dm, Dc and Db has a rotation spindle extending between both ends, and is supported by the selection mechanism unit 152. With this configuration, the position of the developing units Dy, Dm, Dc and Db can be held at a constant position, as shown in FIG. 1, even when the selection mechanism unit 152 is rotated about the rotation axis 152a to select a developing unit.

When a selected developing unit reaches the developing position, the holding frame 153 is moved in the direction of the photosensitive drum 151 about the pivot 153b by the solenoid 153a. In this manner, the developing process is performed.

After that, the recording material P is separated from the transfer drum 154, and conveyed to the fixing unit 155. The fixing unit 155 fixes the toner image on the recording material P using heat and pressure. After the toner image has been fixed, the recording material P is discharged to the discharge tray 160 by the paper discharge unit 159.

Figure 2:
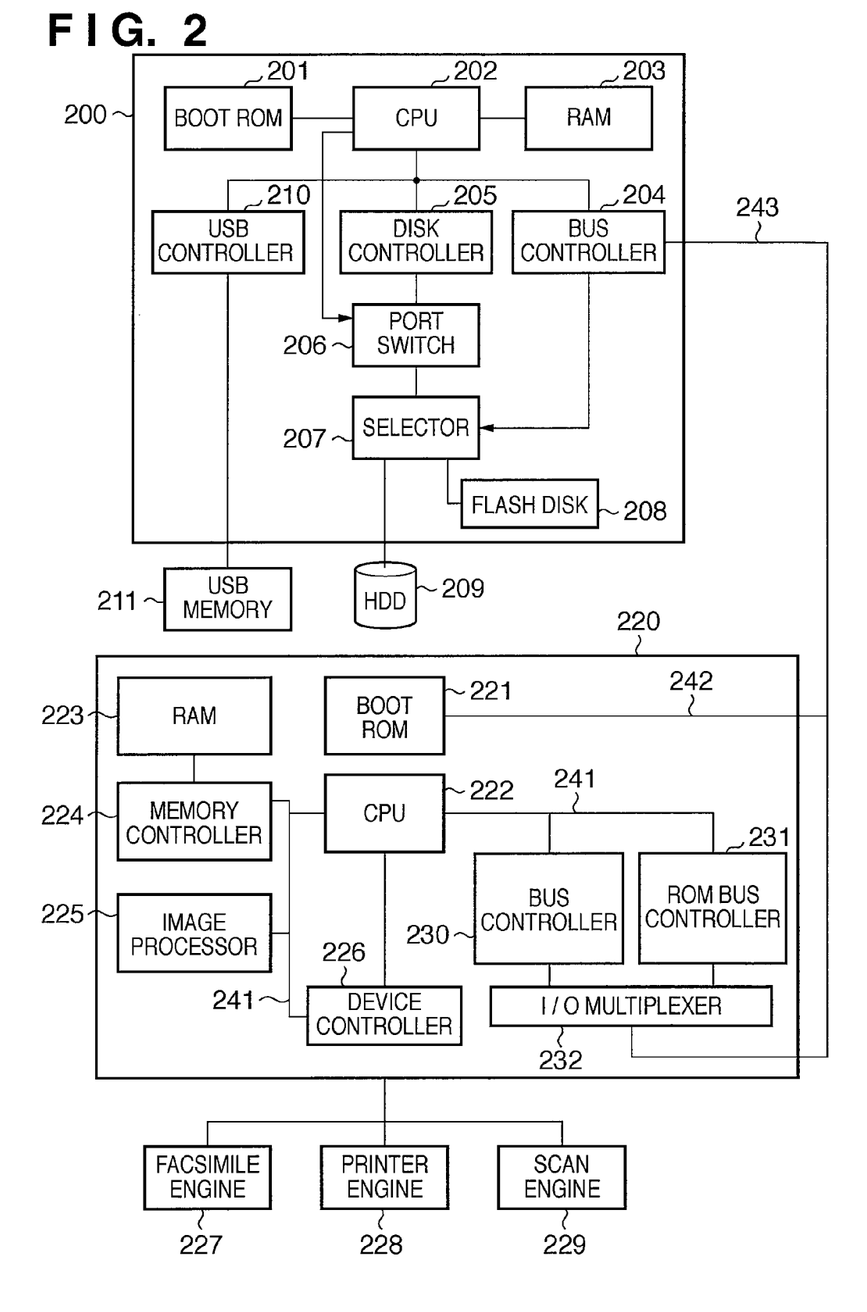
FIG. 2 is a diagram illustrating a configuration for controlling a printer 100 according to Embodiment 1.

FIG. 2 is a diagram illustrating a configuration for controlling the printer 100 according to Embodiment 1. The printer 100 is configured of a main substrate 200 (including the function of the system control unit 110 of FIG. 1) that controls general information processing and a sub-substrate 220 (including the function of the output control unit 130 of FIG. 1) that controls image forming processing. It goes without saying that the main substrate 200 (main system) and the sub-substrate 220 (subsystem) can be configured into a single substrate (system). However, in the present embodiment, a configuration in which the main substrate 200 and the sub-substrate 220 are separate substrates shall be described to simplify the description.

The main substrate 200 includes a boot ROM 201, a CPU 202, a RAM 203, a bus controller 204, a disk controller 205, a port switch 206, a port selector 207, a flash disk 208, and a USB controller 210. The CPU 202 functions as a first control unit for controlling the main substrate 200.

The boot ROM 201 is a non-volatile memory in which a startup program (boot program) for performing a boot process is stored. The CPU 202 is an operation apparatus that executes the startup program and other programs. Examples of other programs include a first OS program (described later), application programs, etc. The CPU 202 is connected to the RAM 203, which temporarily stores programs and data. The USB controller 210 has a function for controlling a USB device such as a USB memory 211.

The bus controller 204 controls the connection with the sub-substrate 220. The disk controller 205 functions as an access control unit, and controls the flash disk 208 and a hard disk drive (hereinafter referred to as "HDD") 209 that is connected to the main substrate 200. In the present embodiment, the flash disk 208 functions as a first storage unit, and the HDD 209 functions as a second storage unit. The disk controller 205 is connected to the port selector 207 via the port switch 206. The port switch 206 functions as a connection breaking unit, and controls permission/prohibition of access to a connected device by controlling the connection to the connected device between a connected state and a disconnected state. The port selector 207 is connected to the flash disk 208 and the HDD 209. The port selector 207 functions as a switching unit, and switches the connection of the disk controller 205 to either the flash disk 208 or the HDD 209. The present embodiment describes the disk controller 205, the port switch 206 and the port selector 207 as separate modules, but part or all of these modules may be combined into a single module.

Meanwhile, the sub-substrate 220 includes a boot ROM 221, a CPU 222, a RAM 223, an image processor 225, and a device controller 226. The sub-substrate 220 further includes a memory controller 224, bus controllers 230 and 231, and an I/O multiplexer 232. The sub-substrate 220 includes buses 241, 242 and 243 that physically connect the controllers. In the sub-substrate 220 shown in FIG. 2, access to the main substrate 200 through the bus (second bus) 243 and access to the boot ROM 221 through the bus (first bus) 242 cannot be made simultaneously, it is therefore necessary to perform exclusive control. The CPU 222 functions as a second control unit for controlling the sub-substrate 220.

The boot ROM 221 is a non-volatile memory for storing a startup program. The CPU 222 is an operation apparatus for executing the startup program and other programs. Other programs include a second OS program (described later), and the like. The RAM 223 temporarily stores programs and data. The memory controller 224 controls the access speed and refresh timing of the RAM 223. The image processor 225 executes image forming processing at a high speed.

The device controller 226 controls image forming devices such as a facsimile engine 227, a printer engine 228, and a scan engine 229 that are connected to the sub-substrate 220, and executes image forming processing. The bus controllers 230 and 231 control permission/prohibition of access to respective buses, access speed, and access timing of respective buses. The I/O multiplexer 232 switches between a plurality of bus input signals, and outputs a signal through a single line. For example, in the sub-substrate 220 shown in FIG. 2, access to the main substrate 200 through the bus 243 and access to the boot ROM 221 through the bus 242 cannot be made simultaneously, and it is therefore necessary to perform exclusive control.

Figure 3:
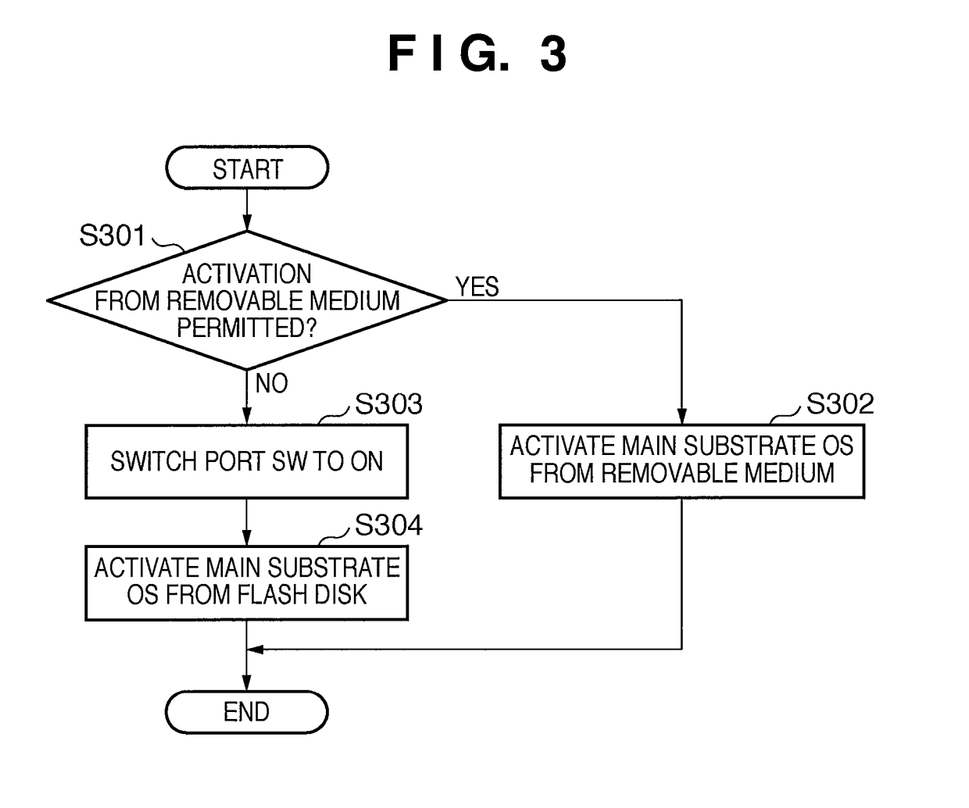
FIG. 3 is a flowchart illustrating a process for activating a main substrate 200 according to Embodiment 1.

Next, a process for activating the printer 100 shall be described with reference to FIGS. 3 to 5B. FIG. 3 is a flowchart illustrating a process for activating the main substrate 200 according to Embodiment 1.

First, when the main substrate 200 is turned on, the CPU 202 sequentially executes the startup program stored in the boot ROM 201. The main substrate 200 may be turned on in step S503, which shall be described later. In step S301, the CPU 202 functions as a determination unit, and determines whether or not to activate the printer 100 using a removable medium which is an accessible storage apparatus. Here, as an example, the USB memory 211 shown in FIG. 2 is used as the removable medium which is an external storage apparatus. The USB memory 211 stores a program (hereinafter referred to as a "first OS program" to simplify the description) for executing the activation process, hardware control, and so on of the printer 100. The first OS program is an OS (operating system) for the main substrate. The first OS program is also stored in advance in the flash disk 208 of the printer 100. The CPU 202 makes the determination by, for example, acquiring a flag (not shown) indicative of whether or not the substrate is in a mode in which it is permitted to activate the printer using the removable medium that is registered in advance in the non-volatile memory. The value of this flag can be changed only by a maintenance worker through authentication using a hardware key, a password, or the like.

If the value of the flag represents a permission mode in which activation from the removable medium is permitted, the CPU 202 copies the first OS program stored in the USB memory 211 to the RAM 203 and sequentially executes the program in step S302. It is assumed here that the USB memory 211 also stores an OS program (second OS program) for activating the sub-substrate 220. The first OS program executed by the CPU 202 reads out the second OS program from the USB memory 211, and stores the second OS program in the RAM 223 of the sub-substrate 220. At this time, the CPU 202 functions as a provision unit. The CPU 222 of the sub-substrate 220 brings the sub-substrate 220 into an operational state by executing the second OS program that has been stored in the RAM 223. Conversely, if the value of the flag does not represent a permission mode, in step S303, the CPU 202 sets the port switch 206 to ON, thereby performing control so as to permit the disk controller 205 to access the flash disk 208 that is connected to the port selector 207. The port selector 207 is configured to select the flash disk 208 when the power is turned on. Then, in step S304, the CPU 202 loads the first OS program from the flash disk 208 into the RAM 203 and executes the program by operating the disk controller 205. Here, the disk controller 205 functions as an access control unit, and permits access to the flash disk 208 or the HDD 209 selected by the port selector 207.

Figure 4:
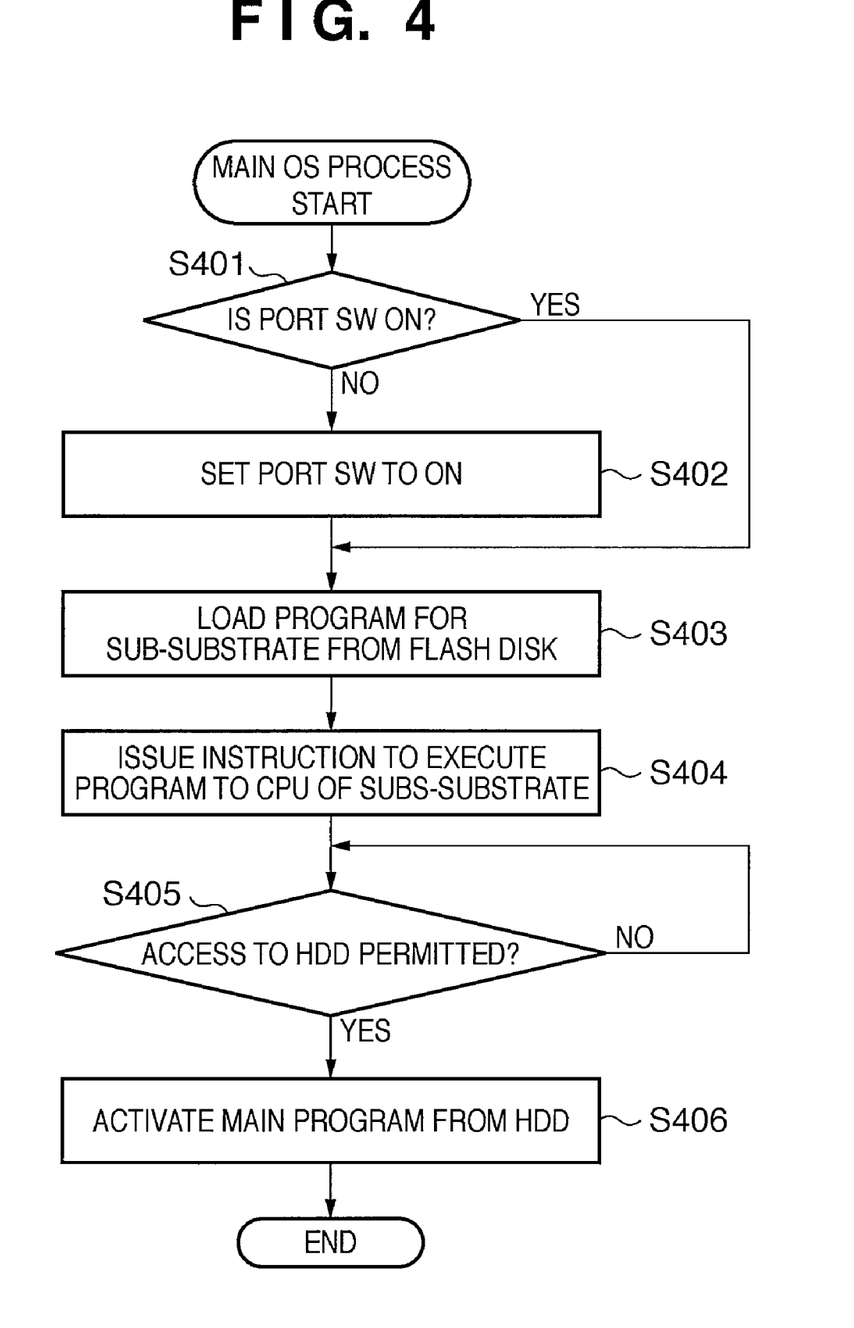
FIG. 4 is a flowchart illustrating a process for a main substrate OS according to Embodiment 1.

FIG. 4 is a flowchart illustrating a process for the Main substrate OS according to Embodiment 1. This process is executed by the CPU 202 in accordance with the first OS program that has been loaded into the RAM 203 from the USB memory 211 in step S302 of FIG. 3 or from the flash disk 208 in step S304. Here, the CPU 202 functions as an activating unit.

In step S401, the CPU 202 determines whether or not the port switch 206 is ON. In other words, the CPU 202 determines whether or not access to the flash disk 208 is permitted. If the port switch 206 is not ON, the CPU 202 sets the port switch 206 to ON in step S402.

According to the present embodiment, if the printer 100 is activated using a removable medium that does not include the authorized first OS program, the process of setting the port switch 206 to ON, as shown in S402, will not be executed. Accordingly, even if the disk controller 205 is operated, access to the flash disk 208 or the HDD 209 is prohibited. Thereby, even if an inappropriate program is executed from the removable medium, the flash disk 208 or the HDD 209 cannot be accessed as long as the method of switching the port switch 206 remains unknown. Therefore, even if an inappropriate program is executed, the printer 100 according to the present embodiment can suppress inappropriate access to the flash disk 208 and the HDD 209, alteration of data, and the like.

Next, in step S403, the CPU 202 operates the disk controller 205 to acquire the OS for the sub-substrate (the second OS program) from the flash disk 208 and provide the second OS program to the sub-substrate 220. In the sub-substrate 220, the transmitted second OS program is loaded into the RAM 223. The detailed process of S403 shall be described later in step S506 of FIG. 5A. Subsequently, in step S404, the CPU 202 issues an instruction to execute the second OS program having been loaded into the RAM 223 to the CPU 222 of the sub-substrate 220. Then, in step S405, the CPU 202 waits in a loop until a notification to permit access to the HDD 209 is sent from the sub-substrate 220.

If a notification to permit access to the HDD 209 is sent in step S405, in step S406, the CPU 202 operates the disk controller 205 to load a main program from the HDD 209 into the RAM 203 and execute the program. The main program is an application program that can be executed by the first OS program, and implements the functions of the image forming apparatus, such as a copy function and a print function. Then, the CPU 202 causes the main substrate 200 to operate in accordance with the main program.

Figure 5A:
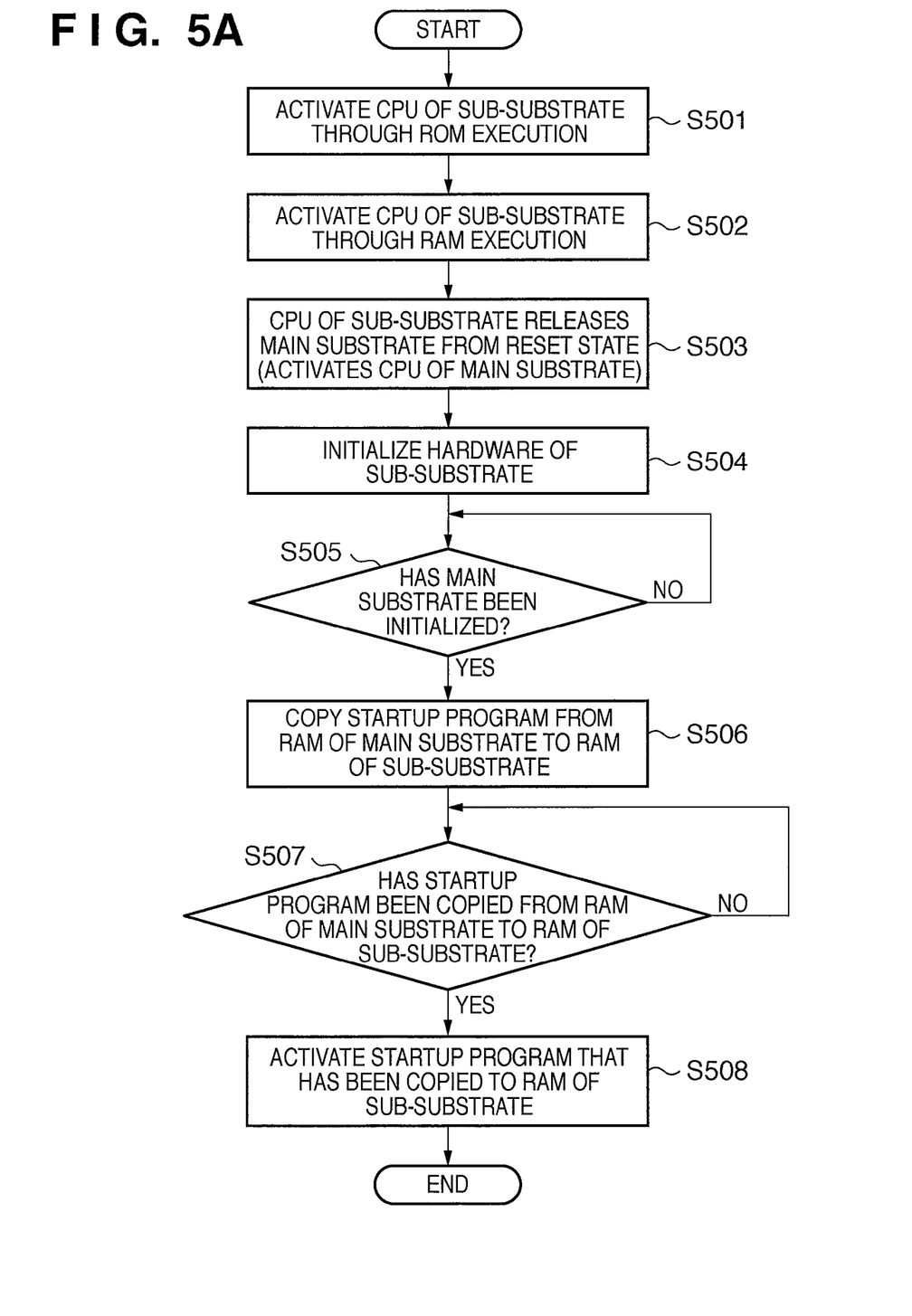
FIGS. 5A and 5B are flowcharts illustrating an activation process performed by a sub-substrate 220 according to Embodiment 1.
Figure 5B:
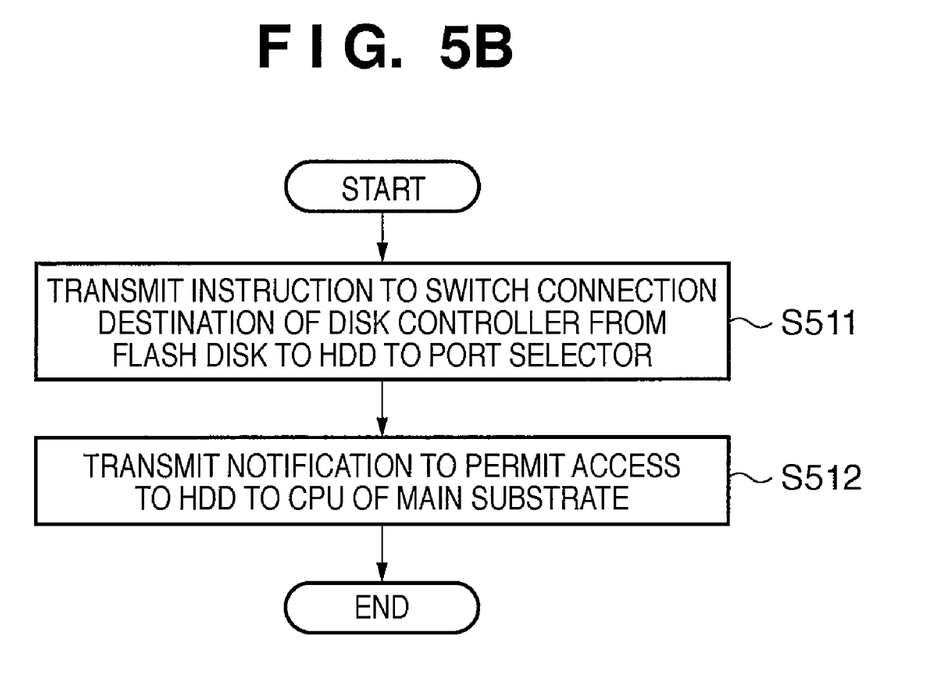

FIGS. 5A and 5B are flowcharts illustrating an activation process performed by the sub-substrate 220 according to Embodiment 1. The process shown in FIG. 5A is executed by the CPU 222 in accordance with the startup program that is stored in the boot ROM 221 after the sub-substrate 220 is turned on at the same time the main substrate 200 is turned on.

As shown in FIG. 5A, in step S501, the CPU 222 executes the startup program while sequentially reading it from the boot ROM 221 through the bus 241, the bus controller 231, the I/O multiplexer 232, and the bus 242. Hereinafter, this operation is referred to as "ROM execution". It is assumed here that the bus controller 231 is operable by default. The CPU 222 initializes the memory controller 224 and the RAM 223.

After the memory controller 224 and the RAM 223 have been initialized, in step S502, the CPU 222 copies the startup program of the boot ROM 221 to the RAM 223, and executes the program while sequentially reading it from the RAM 223. Hereinafter, this operation is referred to as "RAM execution". During this RAM execution, the CPU 222 performs control so that the boot ROM 221 is not accessed. Accordingly, the bus controller 231 does not operate during the RAM execution.

In step S503, the CPU 222 releases the main substrate 200 from its reset state to activate the main substrate 200. The CPU 222 may activate the main substrate 200 by controlling the main substrate 200 to turn on. Then, the main substrate 200 executes the activation process shown in FIG. 3.

In step S504, the CPU 222 initializes the device controller 226, the bus controller 230, the image processor 225, the memory controller 224, and the like. It is necessary to exclusively control access to the main substrate 200 through the bus 243 and access to the boot ROM 221 through the bus 242. However, because control is performed in step S502 so that the boot ROM 221 is not accessed, the exclusive control can be skipped. Accordingly, after step S504, access to the main substrate 200 can be made at the desired timing through the bus 243.

In step S505, the CPU 222 determines whether or not the initialization of the main substrate 200 is finished. Specifically, the CPU 222 determines whether or not the main substrate 200 has been initialized by determining whether or not the CPU 222 has received the instruction of step S404 of FIG. 4. If the initialization of the main substrate 200 is finished, in the main substrate 200, the second OS program is developed in the RAM 203 provided in the main substrate 200 from the HDD 209, the flash disk 208 or the like. In step S506, the CPU 222 copies the second OS program for operating the sub-substrate 220 from the RAM 203 of the main substrate 200 to the RAM 223. Further, in step S507, the CPU 222 repeatedly determines whether or not the copying in step S506 is finished until the copying ends. When the copying ends, in step S508, the CPU 222 executes the copied second OS program (performs RAM execution).

The process executed by the CPU 222 in accordance with the second OS program shall be described next with reference to FIG. 5B. The process shown in FIG. 5B is executed by the CPU 222 in accordance with the second OS program that has been loaded from the flash disk 208 into the RAM 223 in step S403.

As shown in FIG. 5B, in step S511, the CPU 222 operates the port selector 207 to switch the connection line so as to permit access to the HDD 209. The present embodiment employs a hardware configuration in which the port selector 207 can be switched only by the sub-substrate 220; in other words, the port selector 207 cannot be switched by the main substrate 200. Then, in step S512, the CPU 222 functions as a transmission unit, and transmits a notification (permit signal), to permit access to the HDD 209, to the CPU 202 of the main substrate 200.

At this time, the process through the first OS program performed by the main substrate 200 shown in FIG. 4 exits the loop of step S405, and advances to the process of step S406. In other words, the CPU 202 loads the main program from the HDD 209 into the RAM 203 and executes the program.

Figure 6:
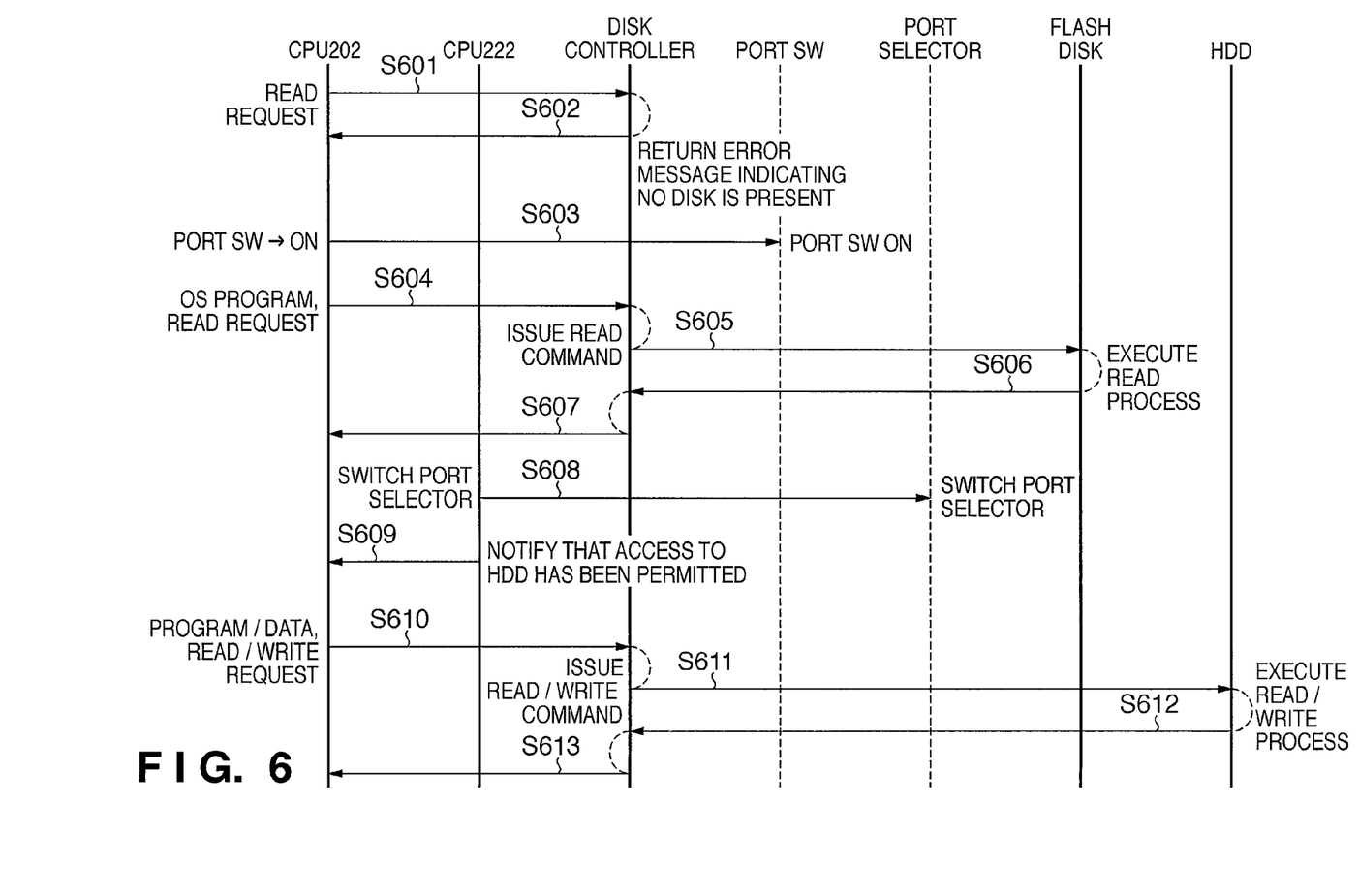
FIG. 6 is a diagram illustrating an activation process sequence according to Embodiment 1.

The entire sequence of the processes described with reference to FIGS. 3 to 5B shall be described next with reference to FIG. 6. FIG. 6 is a diagram illustrating an activation process sequence according to Embodiment 1.

In step S601, for example, if the CPU 202 operates the disk controller 205 to access the flash disk 208 or the HDD 209, because the main substrate 200 has just been activated, the port switch 206 is set to OFF. Accordingly, in step S602, the disk controller 205 returns an error message indicating that no disk is present to the CPU 202. This situation corresponds to when an inappropriate program is executed from a removable medium.

In step S603, the CPU 202 that executes the startup program having been loaded from the boot ROM 201 into the RAM 203 controls the port switch 206 to ON. Then, in step S604, the CPU 202 issues a Read request to the disk controller 205 in order to load the first OS program for the main substrate 200. In steps S605 and S606, the disk controller 205 accesses the flash disk 208 to acquire the first OS program. In step S607, the disk controller 205 returns the first OS program acquired from the flash disk 208 to the CPU 202. In this manner, the first OS program is loaded into the RAM 203 of the main substrate 200, and executed by the CPU 202. Next, the CPU 202 performs the same process as that spanning from step S604 to step S607 described above to load the second OS program from the flash disk 208 into the RAM 223 of the sub-substrate 220 and execute the program.

In step S608, the CPU 222 that executes the second OS program operates the port selector 207 to switch the destination that is accessible by the disk controller 205 from the flash disk 208 to the HDD 209. After the port selector 207 is switched, in step S609, the CPU 222 notifies the CPU 202 that access to the HDD 209 has been permitted.

Subsequently, in step S610, the CPU 202 issues a Read request to the disk controller 205 so as to load the main program. Then, in steps S611 and S612, the disk controller 205 acquires the main program from the HDD 209, and returns the program to the CPU 202.

As described above, the image forming apparatus according to the present embodiment includes the main substrate 200 that is accessible by a removable medium, and the sub-substrate 220. The image forming apparatus according to the present embodiment loads the program for the sub-substrate 220 from the flash disk 208 after the port switch 206 is set to ON by the activating unit that is operated in accordance with the first OS program for the main substrate 200. Thereby, the flash disk 208 and the HDD 209 cannot be accessed by an inappropriate program that does not include the process for switching the port switch 206 even if the inappropriate program is loaded from a removable medium. Therefore, by suppressing access to the flash disk 208 and the HDD 209 from an inappropriate program, acquisition of inappropriate information, alteration of data, and the like can be suppressed in the image forming apparatus according to the present embodiment.

It should be understood that the present invention is not intended to be limited to the embodiment described above, and various modifications can be made. In the image forming apparatus according to the present invention, it is also possible for the sub-substrate 220 alone to select, for example, the flash disk 208 or the HDD 209 as a disk that can be controlled by the disk controller 205. Thereby, the image forming apparatus cannot acquire the main program for the main substrate 200 from the HDD 209 unless the sub-substrate 220 is activated. In other words, the image forming apparatus cannot be operated as long as the aforementioned activating unit does not acquire the second OS program for the sub-substrate 220. Therefore, this image forming apparatus cannot be operated by an inappropriate program that does not include the specified process, and it is thus possible to suppress inappropriate processes. However, the above configuration causes a conflict with the bus that is connected to the main board when updating the content of the boot ROM 221 of the sub-substrate 220, and therefore the following describes a method for solving this problem, with reference to FIG. 9. The process described below is executed by the CPU 202 and the CPU 222. Specifically, the processing spanning from S901 to S903 is executed by the CPU 202, and the processing spanning from S904 to S909 is executed by the CPU 222.

Figure 9:
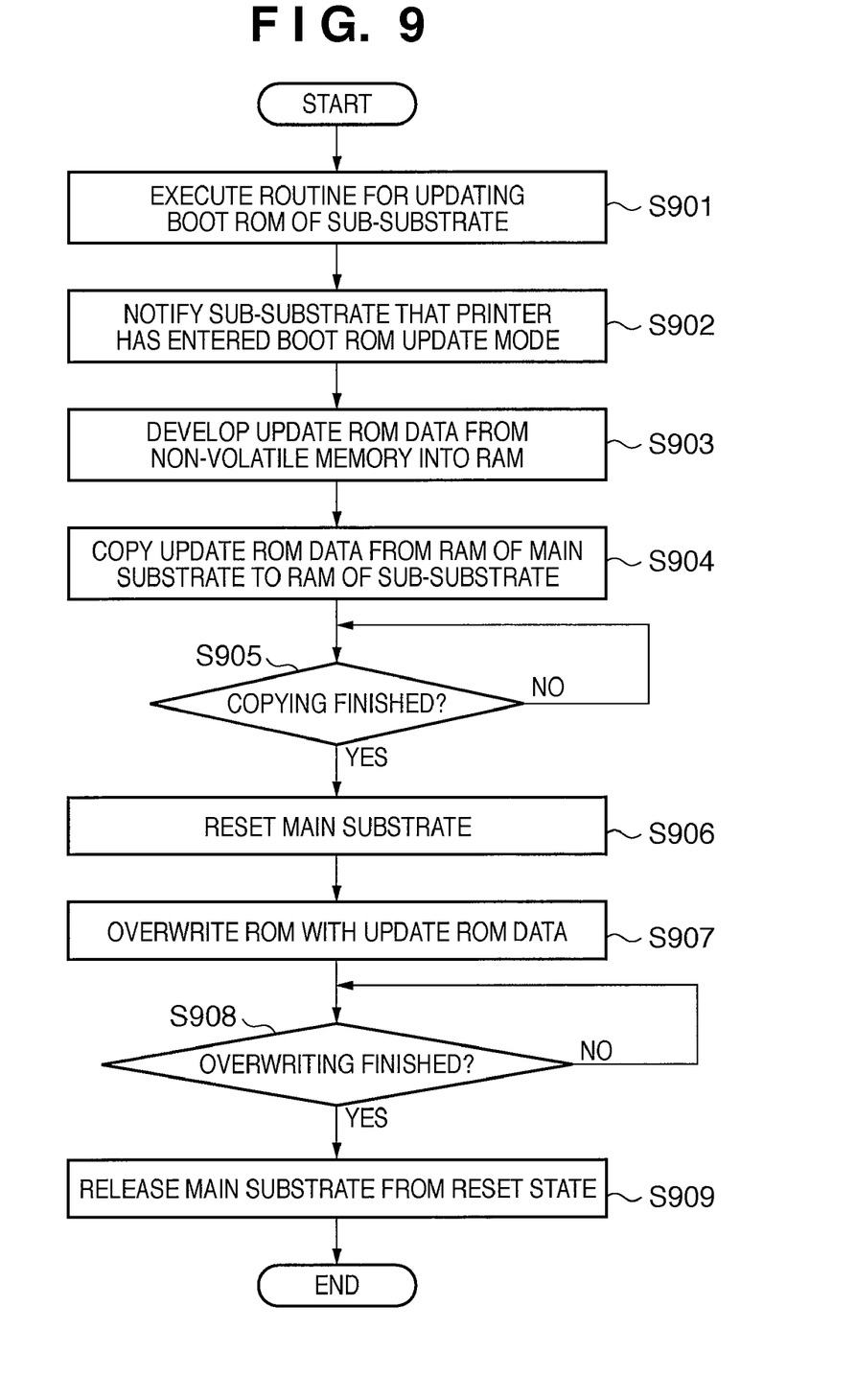
FIG. 9 is a flowchart illustrating a process for updating a boot ROM 221 according to Embodiment 1.

In step S901, the CPU 202 starts a routine for updating the boot ROM 221 of the sub-substrate 220. In step S902, the CPU 202 notifies the CPU 222 that the printer has entered the mode of updating the boot ROM 221. In response thereto, the CPU 222 starts a routine for updating the boot ROM 221. In step S903, the CPU 202 develops update ROM data from a non-volatile memory, such as the USB memory 211, into the RAM 203 of the main substrate 200.

In step S904, the CPU 222 copies the update ROM data having been developed into the RAM 203 of the main board to the RAM 223. In step S905, the CPU 222 determines whether or not the process of step S904 has been completed. If the process of step S904 has been completed, the CPU 222 resets the main substrate 200 in step S906. This disables the CPU 202, and it is therefore possible to perform control so that the bus 243 for communicating between the main substrate 200 and the sub-substrate 220 is not accessed. The CPU 222, of course, performs control so that the main substrate 200 is not accessed through the bus 241, the bus controller 230, the I/O multiplexer 232 or the bus 243. This enables access to the boot ROM 221.

In step S907, the CPU 222 writes the update ROM data in the RAM 223 over the boot ROM 221 (to update). In step S908, the CPU 222 determines whether or not the overwriting of the boot ROM 221 has been completed. If the overwriting has been completed, in step S909, the CPU 222 releases the main substrate 200 from its reset state to reactivate the main board. Alternatively, the CPU 222 may reactivate the main substrate 200 by controlling the main substrate 200 to turn on. After that, the main substrate 200 performs a reactivation process, and the process of updating the boot ROM 221 ends.

Embodiment 2

Embodiment 2 shall be described next with reference to FIGS. 7 and 8. A feature of the present embodiment is activating the printer 100 using the flash disk 208 when a fatal error occurs in the HDD 209. Accordingly, a printer 100 of the present embodiment can be activated even if a fatal error occurs in the HDD 209. When activated using the flash disk 208, the printer 100 operates with limited functionality.

Figure 7:
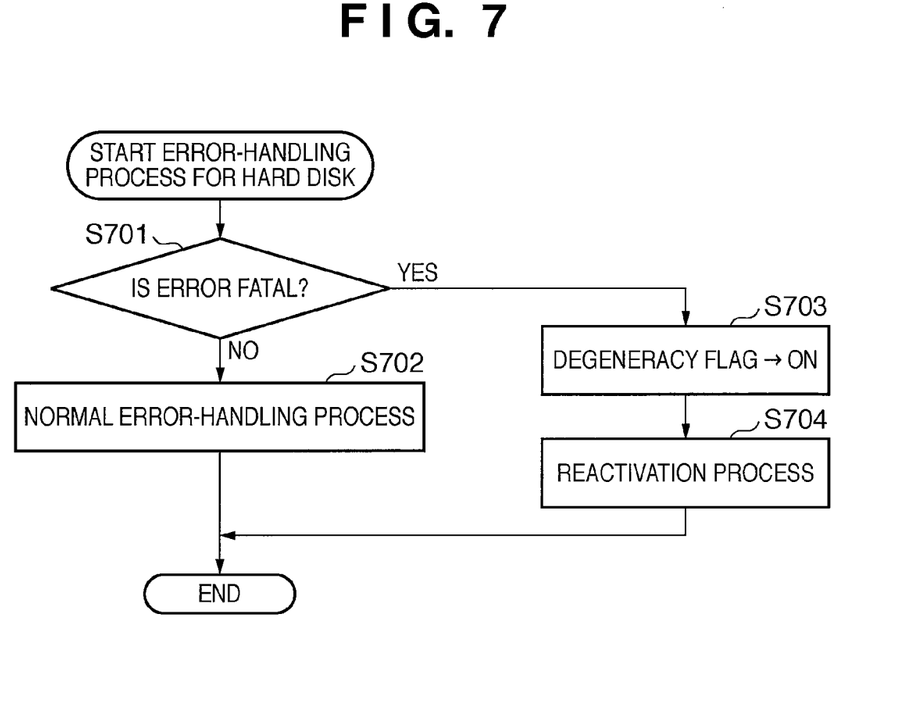
FIG. 7 is a flowchart illustrating an error-handling process for a HDD 209 according to Embodiment 2.

FIG. 7 is a flowchart illustrating an error-handling process for the HDD 209 according to Embodiment 2. The process described below is an error-handling process performed by the CPU 202 when an error occurs in the HDD 209.

In step S701, the CPU 202 determines whether or not an error that has occurred in the HDD 209 is fatal. As used herein, "fatal error" means an error that renders activation of the printer 100 or image forming processing impossible. If the error is not fatal, in step S702, the CPU 202 performs an error-handling process such as a retry process or an error display process, and ends the error-handling process.

Conversely, if the error is fatal, in step S703, the CPU 202 sets a degeneracy flag (not shown) assigned to the non-volatile memory to 1. Then, in step S704, the CPU 202 restarts the system, and ends the process.

Figure 8:
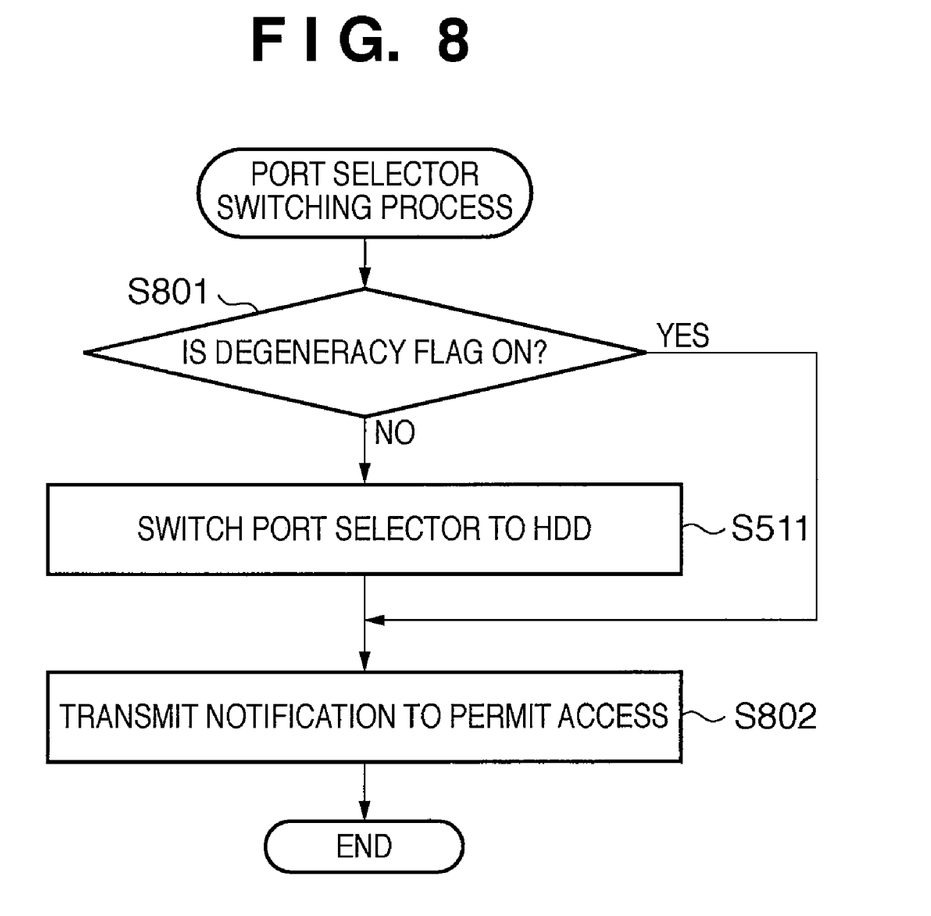
FIG. 8 is a flowchart illustrating an activation process performed by the sub-substrate 220 according to Embodiment 2.

FIG. 8 is a flowchart illustrating an activation process of the sub-substrate 220 according to Embodiment 2. The process described below is a process obtained by modifying the activation process of the sub-substrate 220 shown in FIG. 5B, which was described in Embodiment 1, to achieve the present embodiment.

In step S801, the CPU 222 determines whether or not the degeneracy flag assigned to the non-volatile memory is set to ON. Specifically, if the degeneracy flag is set to 1, the CPU 222 determines that the degeneracy flag is set to ON. If the degeneracy flag is set to 0, the CPU 222 determines that the degeneracy flag is set to OFF.

If the degeneracy flag is 0, in step S511, the CPU 222 switches the port selector 207 from the flash disk 208 to the HDD 209. If, on the other hand, the degeneracy flag is 1, the CPU 222 moves the process to S802 without executing the process of step S511. In this case, the port selector 207 is not switched, and thus the flash disk 208 remains selected by the port selector 207.

In step S802, the CPU 222 transmits a notification to permit access to the HDD 209 or the flash disk 208 to the CPU 202. This process may be the same as that of S512. In other words, the CPU 202 does not have to necessarily be aware of the fact that the port selector 207 is connected to the flash disk 208 or the HDD 209. This is because the process of the CPU 202 is only for issuing a Read request to load the main program to the disk controller 205, and the access destination is not clearly specified.

When the CPU 202 issues a Read request, because the port selector 207 is connected to the flash disk 208, the disk controller 205 reads the main program from the flash disk 208, and not from the HDD 209. A function limited application program that does not use HDD has been stored in the flash disk 208 as the main program for the main substrate 200. Accordingly, when the degeneracy flag is set to 1, the function limited application program of the flash disk 208 is loaded, whereas when the degeneracy flag is set to 0, the normal program of the HDD 209 is loaded. If the system operates normally after a maintenance worker has replaced the HDD 209, by setting the degeneracy flag to 0, the main program for the main substrate 200 will be loaded from the HDD 209 the next time the system is activated.

As described above, according to the present embodiment, a function limited program that does not use the HDD is stored in the flash disk 208 in advance. In this case, if a fatal error is detected in the error-handling process for the HDD 209, the degeneracy flag assigned to a non-volatile storage region is set to 1, and reactivation is performed.

The process of switching the port selector to the HDD is performed only when the degeneracy flag is not set to 1 in the program for the sub-substrate during activation, or in other words, only when the flag is set to 0. With such a configuration, even if the HDD 209 is broken, the function-limited program stored in the flash disk 208 is executed, it is therefore possible to avoid a situation in which the image forming apparatus does not function if the HDD 209 is broken, as is the case with the conventional technology.

Other Embodiments

While various embodiments have been described in detail above, the present invention may also be applied in a system configured of a plurality of devices or in an apparatus configured of a single device. For example, the present invention can be applied to a printer, a facsimile, a PC, a computer system that includes a server and a client, or the like.

The present invention can also be achieved by directly or remotely supplying a computer program that implements the functions of the aforementioned embodiments to a system or an apparatus, and loading and executing the supplied program code with a computer included in the system or the like.

Accordingly, the program code itself that is installed in a computer so as to implement the functions/processes of the present invention through the computer also realizes the present invention. In other words, the computer program itself for realizing the functions/processes of the present invention also falls within the scope of the present invention.

In this case, the program may be in any form, and object code, a program executed through an interpreter, script data supplied to an OS, or the like may be used as long as it has the function of the program.

Examples of recording media that can be used for supplying the program include flexible disks, hard disks, optical disks, magneto-optical disks, MOs, CD-ROMs, CD-Rs, and CD-RWs. Other examples include magnetic tape, non-volatile memory cards, ROMs, and DVDs (DVD-ROMs, DVD-Rs).

The program may also be downloaded from a website on the Internet using a browser possessed by a client computer. In other words, the computer program of the present invention itself, or a compressed file that includes the auto-install function may be downloaded from a website to a recording medium such as a hard disk. Further, the present invention can also be achieved by dividing program code that constitutes the program of the present invention into a plurality of files and downloading the files from different websites. In other words, a WWW server that downloads, to multiple users, the program files that implement the functional processes of the present invention through a computer may also be a constituent element of the present invention.

Further, the program of the present invention may be encrypted and stored in a storage medium such as a CD-ROM, and distributed to users. In this case, it is possible to allow only users who have satisfied predetermined conditions to download key information for decryption from a website through the Internet, execute decryption of the encrypted program using that key information, and install the program on a computer.

The functions of the embodiments described above may also be realized by executing the program read by the computer. In this case, part or all of the actual processing may be performed by the OS running on the computer, based on the instructions of the program. The functions of the embodiments described above can be achieved in this case as well.

Furthermore, the program loaded from the recording medium may be written into a memory provided in a function expansion board inserted into a computer or a function expansion unit connected to a computer, and a CPU or the like provided in the function expansion board or the function expansion unit may perform part or all of the actual processing based on the instructions of the program. The functions of the embodiments described above may be realized in the above-described manner.

The present invention can provide an image forming apparatus that includes a first system and a second system, wherein the permission/prohibition of access to a storage unit provided in the first system is controlled appropriately based on a signal transmitted from the second system, and a control method thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-163017 filed on Jun. 20, 2007, which is hereby incorporated by reference herein in its entirety.

What is claimed is:

1. An image forming apparatus including a first system and a second system,
the first system comprising:
a first control unit adapted to control the first system;
a connection unit adapted to connect to an external storage unit adapted to store a first OS program for operating the first system and a second OS program for operating the second system;
an application program storage unit adapted to store an application program that is executable by the first OS program;

an access control unit adapted to control access to the external storage unit and the application program storage unit; and a provision unit adapted to acquire the second OS program from the external storage unit and provide the acquired second OS program to the second system, and the second system comprising:

a second control unit adapted to control the second system, the second control unit operating the second system based on the second OS program provided by the provision unit; and a transmission unit adapted to transmit, to the access control unit, a permit signal for permitting the first control unit to access the application program storage unit, in response to the second system being in an operational state, wherein the access control unit prohibits the first control unit from accessing the application program storage unit until the access control unit receives the permit signal, and permits the first control unit to access the application program storage unit upon receiving the permit signal.

2. The image forming apparatus according to claim 1, wherein the access control unit comprises:

a switching unit adapted to switch the connection to either of the external storage unit and the application program storage unit; and a connection control unit adapted to perform control to permit or prohibit the access by controlling the connection to a connected state or disconnected state.

3. The image forming apparatus according to claim 2, wherein the switching unit switches the connection from the disconnected state to the connected state based on the permit signal.

4. The image forming apparatus according to claim 1, further comprising:

an OS program storage unit adapted to store the first OS program and the second OS program; and a determination unit adapted to determine whether or not to activate the first system using the external storage apparatus, wherein the access control unit permits the first control unit to access the OS program storage unit when activating the first system without using the external storage apparatus, and prohibits the first control unit from accessing the OS program storage unit and the application program storage unit when activating the first system using the external storage apparatus.

5. The image forming apparatus according to claim 4, further comprising a non-volatile memory that stores information indicative of whether or not to use the external storage apparatus to activate the first system, wherein the determination unit determines using the information stored in the non-volatile memory.

6. The image forming apparatus according to claim 4, further comprising:

a unit adapted to determine whether or not a failure has occurred in the application program storage unit; and a storage unit adapted to store information indicative of whether or not a failure has occurred in the application program storage unit, wherein the OS program storage unit further stores the application program whose function has been limited, the access control unit prohibits the switching of the connection from the OS program storage unit to the application program storage unit using the access control unit when the information stored in the storage unit indicates that a failure has occurred in the application program storage unit, and the first control unit executes the function limited application program acquired from the OS program storage unit.

7. The image forming apparatus according to claim 1, further comprising:

a first bus connected to a boot memory that stores a boot program for executing a boot process when the second system is turned on;

a second bus connected from the second system to the first system;

an exclusive control unit adapted to exclusively control access to the first bus and the second bus; and a prohibition unit adapted to prohibit access to the first bus or the second bus, the prohibition unit prohibiting access to the first bus in order to skip the process performed by the exclusive control unit after the boot program has been loaded.

8. A method for controlling an image forming apparatus including a first system that is controlled by a first control unit, a second system that is controlled by a second control unit, a connection unit adapted to connect to an external storage unit adapted to store a first OS program for operating the first system and a second OS program for operating the second system, and an application program storage unit adapted to store an application program that is executable by the first OS program, the method comprising the steps of:

controlling access to the external storage unit and the application program storage unit;

providing the second OS program to the second system after acquiring the second OS program from the external storage unit;

operating the second system based on the second OS program provided in the providing step; and transmitting, from the second system to the first system, a permit signal for permitting the first control unit to access the application program storage unit, in response to the second system being in an operational state, wherein the access control step prohibits the first control unit from accessing the application program storage unit until the first system receives the permit signal, and permits the first control unit to access the application program storage unit, in response to the first system receiving the permit signal.

9. The method for controlling an image forming apparatus according to claim 8, wherein the access control step comprises the steps of:

switching the connection to either of the external storage unit and the application program storage unit; and performing control to permit or prohibit the access by controlling the connection to a connected state or disconnected state.

10. The method for controlling an image forming apparatus according to claim 9, wherein the switching step switches the connection from the disconnected state to the connected state based on the permit signal.

11. The method for controlling an image forming apparatus according to claim 8, further comprising a step of determining whether or not to activate the first system using the external storage apparatus, wherein the access control step permits the first control unit to access an OS program storage unit that is provided in the image forming apparatus and adapted to store the first OS program and the second OS program when activating the first system without using the external storage apparatus, and prohibits the first control unit from accessing the OS program storage unit and the application program storage unit when activating the first system using the external storage apparatus.

12. The method for controlling an image forming apparatus according to claim 11, wherein the determining step determines using information that is stored in a non-volatile memory that stores information indicative of whether or not to use the external storage apparatus to activate the first system provided in the image forming apparatus.

13. The method for controlling an image forming apparatus according to claim 9, further comprising the steps of:
  determining whether or not a failure has occurred in the application program storage unit; and
  storing information indicative of whether or not a failure has occurred in the application program storage unit,
  wherein the OS program storage unit further stores the application program whose function has been limited,
  the access control step prohibits the switching of the connection from the OS program storage unit to the application program storage unit in the access control step when the information stored in the storage step indicates that a failure has occurred in the application program storage unit, and
  the first control step executes the function limited application program acquired from the OS program storage unit.

14. The method for controlling an image forming apparatus according to claim 8, further comprising the steps of:
  exclusively controlling access to a first bus connected to a boot memory that stores a boot program for executing a boot process when the second system is turned on and access to a second bus connected from the second system to the first system, and
  prohibiting access to the first bus or the second bus, wherein access to the first bus is prohibited to skip the process of the exclusive control step after the boot program has been loaded.

* * * * *